(12) United States Patent
Ghosh

(10) Patent No.: US 6,982,866 B2
(45) Date of Patent: Jan. 3, 2006

(54) LIGHTWEIGHT ROBUST ENCLOSURE DESIGN FOR A MOBILE COMPUTING SYSTEM

(75) Inventor: Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/366,991

(22) Filed: Feb. 14, 2003

(65) Prior Publication Data

US 2004/0160732 A1   Aug. 19, 2004

(51) Int. Cl.
*H05K 7/20* (2006.01)
(52) U.S. Cl. .................. 361/679; 361/702; 361/707; 165/80.3
(58) Field of Classification Search ............... 361/679, 361/680, 681, 682, 683, 686, 687, 692, 702–711, 361/816–818, 752–759; 29/592.1, 832, 840; 165/80.2, 80.3, 185; 244/1 R, 129.1, 131; 428/33, 64.1, 64.3, 64.4, 65.2; 174/35, 35 R, 174/16.3, 35 MS, 52.2, 252
See application file for complete search history.

(56) References Cited

U.S. PATENT DOCUMENTS

| | | | | |
|---|---|---|---|---|
| 5,045,971 A | * | 9/1991 | Ono et al. | 361/704 |
| 5,363,227 A | * | 11/1994 | Ichikawa et al. | 349/60 |
| 5,566,055 A | * | 10/1996 | Salvi, Jr. | 361/816 |
| 6,400,571 B1 | * | 6/2002 | Kimura et al. | 361/704 |
| 6,618,936 B2 | * | 9/2003 | Bovio et al. | 29/832 |
| 2002/0048148 A1 | * | 4/2002 | Horiuchi et al. | 361/680 |
| 2003/0137801 A1 | * | 7/2003 | Shimada et al. | 361/679 |

* cited by examiner

*Primary Examiner*—Michael Datskovskiy
(74) *Attorney, Agent, or Firm*—Blakely, Sokoloff, Taylor & Zafman LLP

(57) ABSTRACT

In one embodiment, the invention provides an enclosure for a mobile computing system. The enclosure comprises a hollow body shaped and dimensioned to house a processing module, and a display module for a tablet personal computer, wherein the hollow body is defined by a top panel, a bottom panel, and a peripheral side panel, wherein the top and bottom panels are fabricated to have zones of increased, and reduced thicknesses which correspond to areas of the processing module have produced, and greater height, respectively.

19 Claims, 5 Drawing Sheets

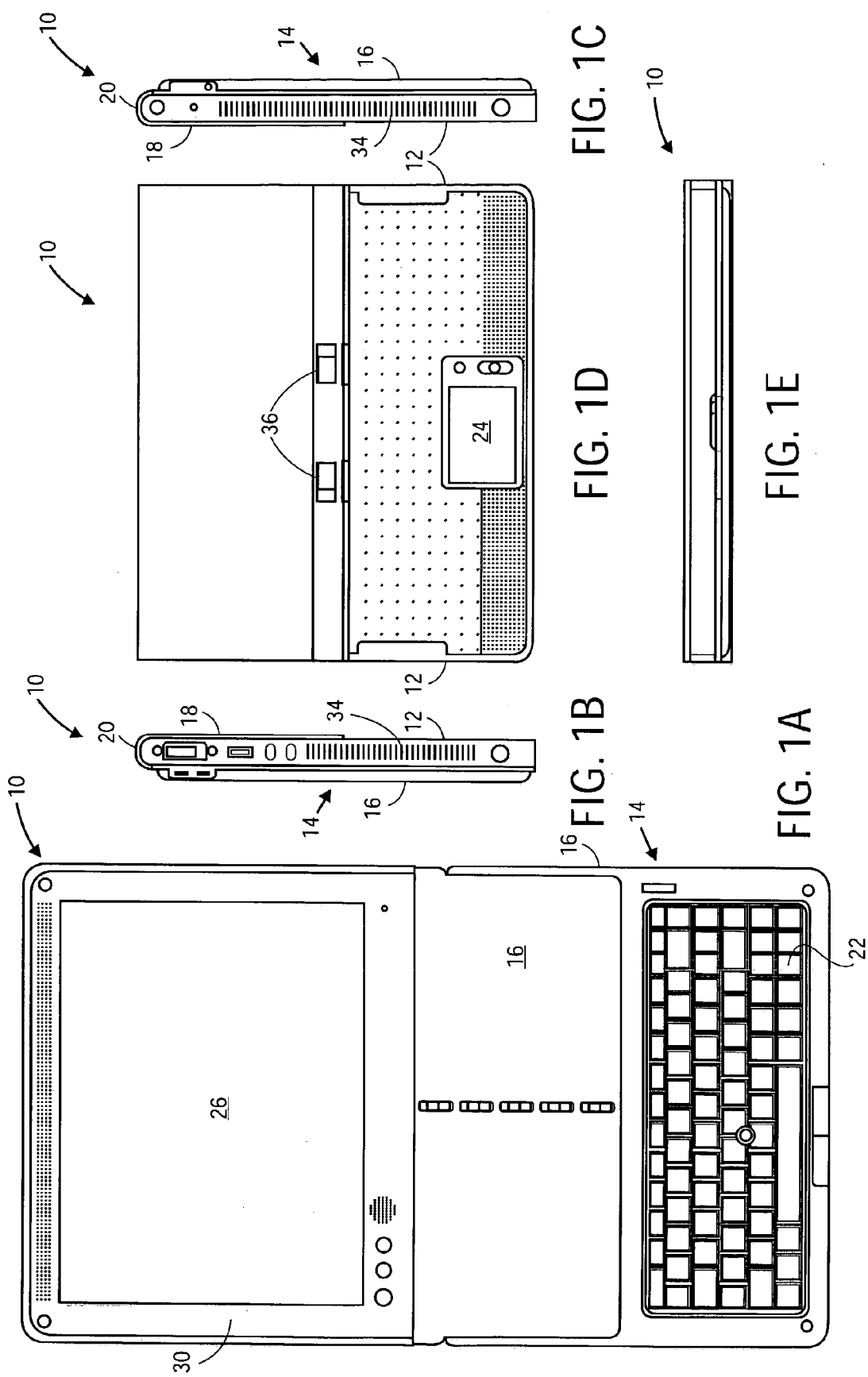

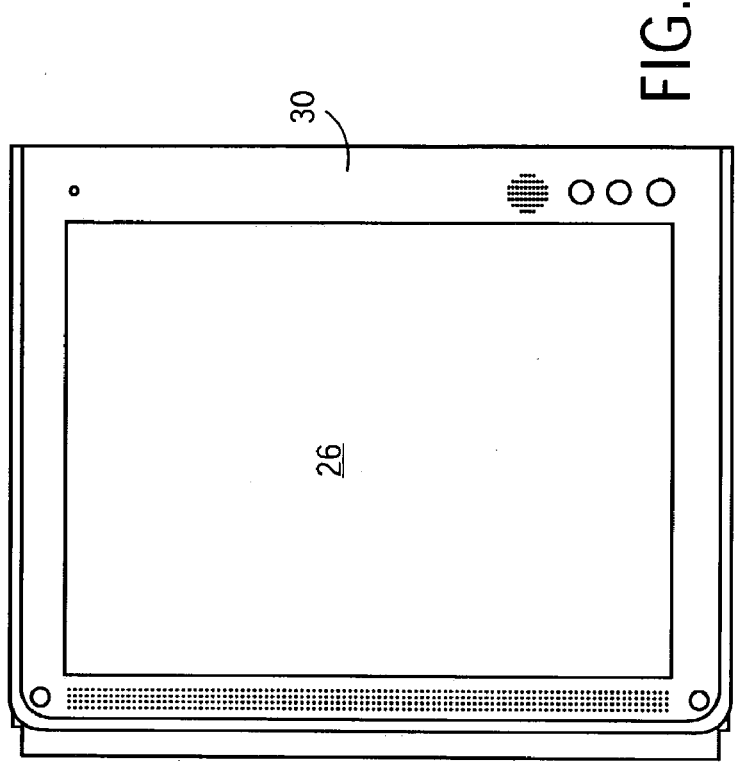
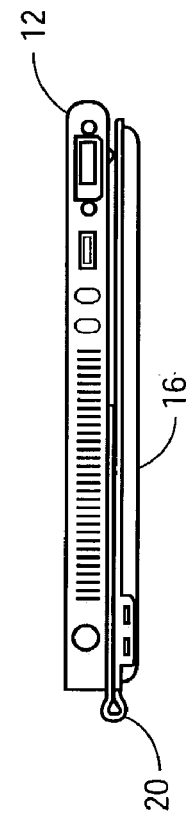
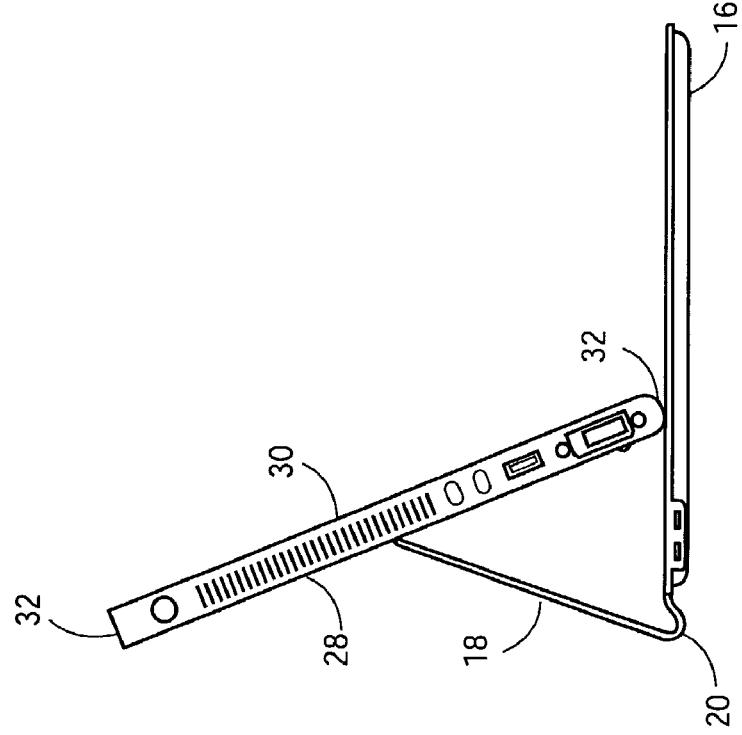
FIG. 3A
FIG. 3B
FIG. 2

LIGHTWEIGHT ROBUST ENCLOSURE DESIGN FOR A MOBILE COMPUTING SYSTEM

FIELD OF THE INVENTION

This invention relates to mobile computing systems. In particular, it relates to the fabrication of an enclosure for a mobile computing system.

BACKGROUND

An important determinant of the utility of mobile computing systems, such as notebook computers and pen-based computing systems is the form factor of such systems. Compact form factors promote utility and are therefore desirable.

Another determinant of the utility of such systems is the weight of these systems. For greater utility, a lightweight system is desirable.

For the above reasons, an enclosure for a mobile computing system should be as thin and as lightweight as possible. However, if the enclosure is made too thin, strength is compromised resulting in breakage or at least damage to the enclosure and to the electronics components within the enclosure.

BRIEF DESCRIPTION OF THE DRAWINGS

FIGS. 1A to 1E show various views of a mobile computing system comprising a tablet unit and a base unit, according to one embodiment of the invention;

FIG. 2 shows a side view of the mobile computing system of FIGS. 1A to 1E, in which the tablet unit and the base unit are positioned for use in a laptop mode configuration;

FIGS. 3A and 3B show views of the mobile computing system of FIGS. 1A to 1E, in which the tablet unit and the base unit are positioned for use in a tablet mode configuration;

DETAILED DESCRIPTION

Figure 4:
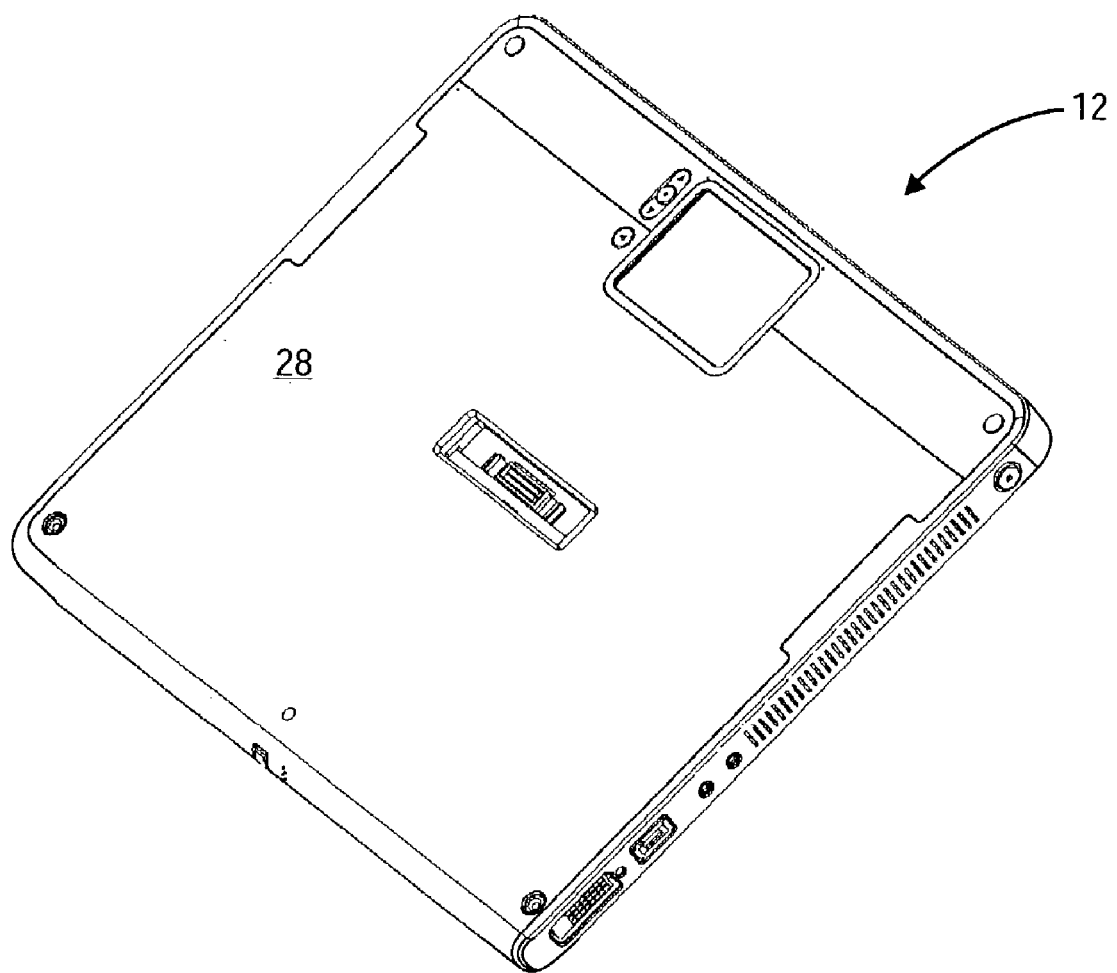
FIG. 4 shows a perspective view of an enclosure for the mobile computing system of FIGS. 1A to 1E, in which a top wall of the tablet unit can be seen.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

FIGS. 1A to 1E of the drawings show various views of a pen-based computing system in accordance with one embodiment of the invention. In one embodiment, the computing system 10 is in a form of a tablet personal computer (PC) and accordingly includes a tablet unit 12 and a base unit 14. The base unit 14 is generally rectangular and comprises first and second panels 16, 18, respectively. The panels 16, 18 are hingedly connected together via a hinge 20 which permits articulation of the panels 16,18 relative to each other. The first panel 16 bears a keyboard 22 which permits data entry into the tablet unit 12 during a laptop mode of operation.

The tablet unit 12 is generally rectangular and comprises various processing and display modules mounted on a motherboard substrate. For example, the processing modules may include a processor and a memory hierarchy comprising memory devices configured to store code for execution by the processer in response to user input. The display modules may include a mini-screen 24, which in one embodiment may be a liquid crystal display (LCD) screen, and a large screen 26. The large screen 26 includes a digitizer associated therewith to convert handwriting input via a pen or stylus into a digital signal which can be converted by handwriting recognition software into appropriate characters.

The components of the tablet unit 12 are enclosed within a generally rectangular enclosure comprising top and bottom walls 28, 30, respectively, and peripheral side walls 32 (see FIG. 2). The walls 28, 30, 32 are generally fabricated of a lightweight material having sufficient strength. In one embodiment, the walls 28, 30, 32 may be fabricated using steel, or aluminum.

As will be seen in FIGS. 1B and 1C, the side walls 32 have airflow vents 34 to permit airflow into the enclosure to facilitate cooling of the electronic components therein.

The system 10 includes a carry mode in which the tablet unit 12 is supported on the first panel 16 of the base unit 14 and the second panel 18 is folded over a top of the tablet unit 12. In order to secure the tablet unit 12 and the base unit 14 in the carry mode configuration, a locking mechanism is provided. The locking mechanism comprises a pair of pivotally mounted latches 36 supported by the second panel 18 of the base unit 14. The latches 36 are adapted to mate with complementary locking formations provided in the tablet unit 12. As can be seen in FIG. 1D, in the carry mode configuration, the system resembles a portfolio.

The system 10 also includes a laptop mode configuration, in which the tablet unit 12 is held at an inclined position relative to the base unit 14 by the second panel 18 which functions essentially as a prop to support the tablet unit 12 in the inclined position. The laptop mode configuration is illustrated in FIG. 2 of the drawings. In the laptop mode configuration, the system 10 may be operated in a fashion similar to a conventional laptop, in which a primary mode of data entry is via the keyboard 22.

The system 10 also includes a tablet mode configuration, in which the second panel 18 of the base unit 14 is folded to lie against the first panel 16, and the tablet unit 12 is placed over the folded second and first panels 18, 16 of the base unit 14, in an orientation in which the large display screen 26 is exposed. In the tablet mode configuration, a user may input data into the system 10 using a pen or stylus by writing directly on the screen 26 as described above.

For greater utility of the system 10, it will be appreciated that the enclosure should be as lightweight, and as robust, as possible. Further, a form factor of the enclosure should be as compact as possible.

Figure 5:
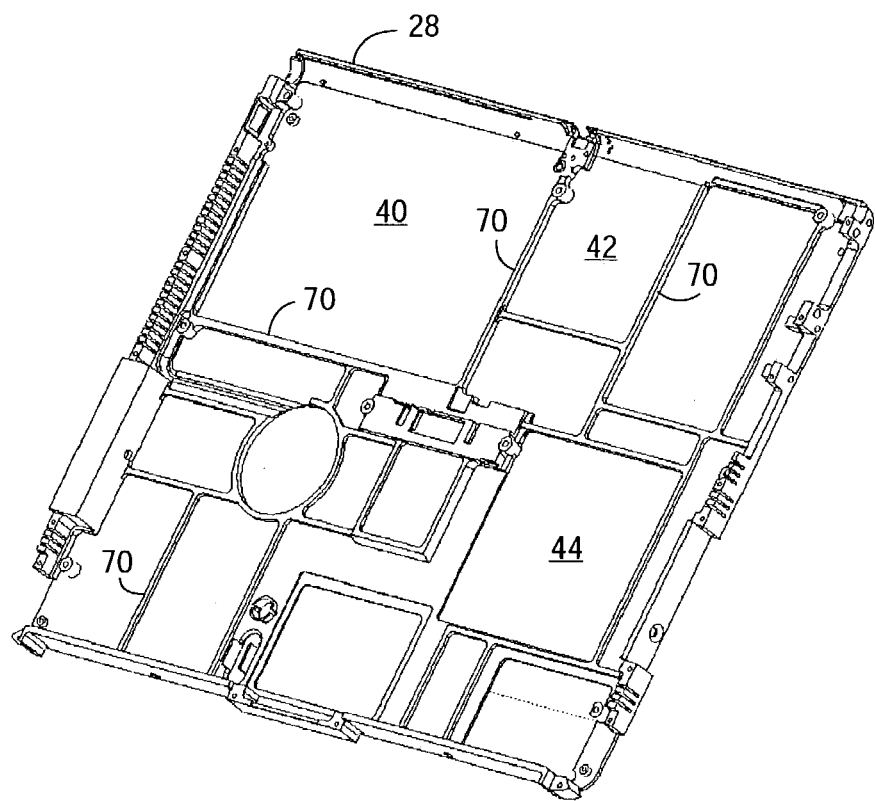
FIG. 5 shows a perspective view of an underside of the top wall of FIG. 4.
Figure 6:
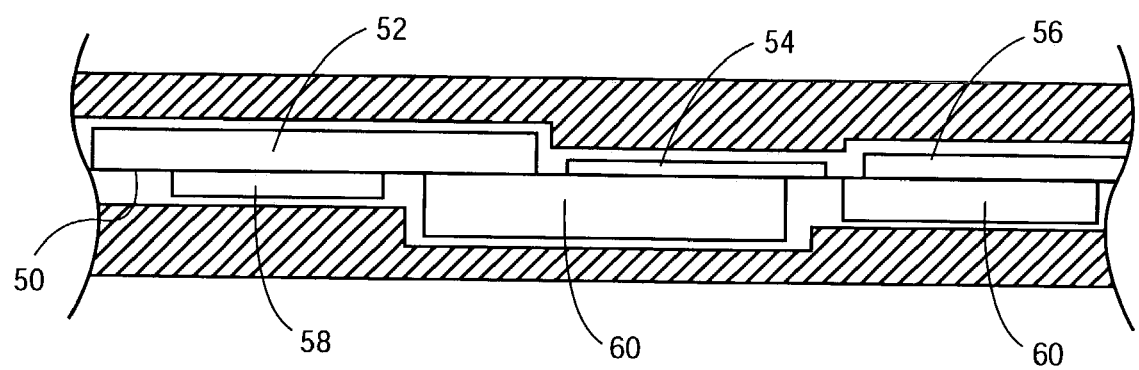
FIG. 6 shows a partial cross-sectional view through an enclosure for a mobile computing system, in accordance with one embodiment of the invention.

In order to achieve an enclosure of lightweight and robust design, and which has a minimum form factor, in one embodiment each of the top wall 28 and the bottom wall 30 are fabricated to have zones of different thicknesses. FIGS. 4 and 5 of the drawings show perspective views of the top wall 28 of an enclosure for the tablet unit 12, in accordance with one embodiment. As will be seen from FIG. 4, an outer surface of the top wall 28 is smooth. However, an inner surface of the top wall 28 includes zones 40, 42, and 44 of different thicknesses (see FIG. 5). The thickness of each zone 40, 42, and 44 is determined by a height by which adjacent electronic components of the electronic assembly housed within the enclosure stand proud of a substrate surface on which the components are mounted. This concept is illustrated in FIG. 6 of the drawings, which shows a portion of a motherboard substrate 50 which includes electronic components 52 to 60. As will be seen, the electronic components 52 to 60 have different heights by which they stand proud of the substrate 50. Thus, according to the above described technique for fabricating an enclosure, the top and bottom walls 28, 30 of the enclosure have zones of different thicknesses, each zone being matched to a height by which the electronic components stand proud of the substrate surface. For example, regions where the electronic components have a greater height above the substrate surface, coincide with zones of those reduced thickness. Conversely, regions that coincide with components of the electronic assembly that have a lesser height, the zones have an increased thickness.

In one embodiment, the thick zones may be between 1.5 and 3.0 mm, and the thin zones would have a thickness of between 0.3 and 0.8 mm.

In another embodiment of the invention, strengthening formations in the form of strengthening beams 70 are used to strengthen the top and bottom walls 28, 30. In one embodiment, the strengthening beams 70 have a height of 1 to 3 mm by which they stand proud of the top and bottom walls 28, 30 and a width of between 0.5 and 2.5 mm. Each of the beams 70 may be integrally formed with top and bottom walls 28, 30. In order to add greater rigidity, in one embodiment, the beams are interconnected, as can be seen in FIG. 5 of the drawings.

In another embodiment, in order to achieve the enclosure of lightweight and robust design, and which has a minimum form factor, each of the top walls 28 and the bottom walls 30 are fabricated by first constructing a frame comprising a plurality of interconnected structural beams. Thereafter, the frame is covered with a sheet material which in addition to functioning as a cover to prevent the ingress of dust into the enclosure, also functions as a strengthening element to strengthen the frame by providing resistance to torsional deflection of the frame. Thereafter, side walls are fabricated to interconnect the top and bottom walls.

Figure 7:
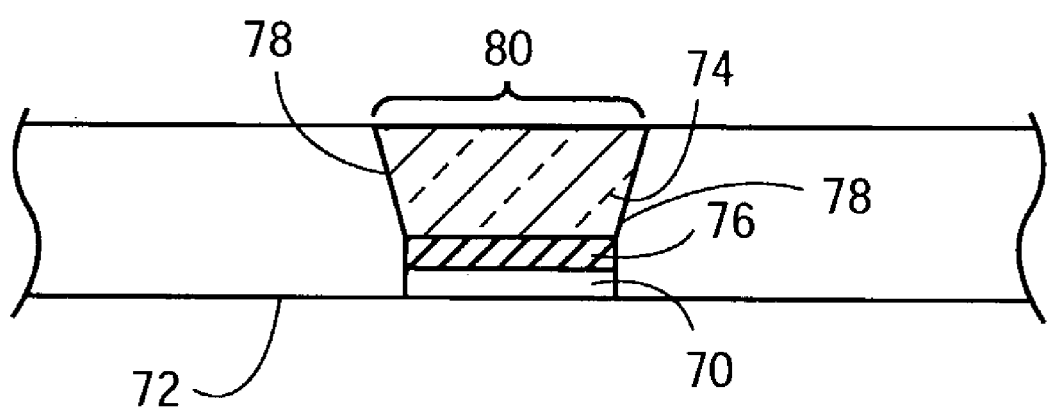
FIG. 7 shows a partial cross-sectional view through an enclosure for a mobile computing system, in accordance with another embodiment of the invention.

It will be appreciated that the electronic components of the tablet unit 12 may generate significant quantities of heat. Thus, in one embodiment, the enclosure is provided with a heat sinking mechanism to draw heat away from heat producing electronic components of the tablet unit 12. FIG. 7 of the heat producing electronic components of the tablet unit 12. FIG. 7 of the drawings, shows one embodiment of the heat sinking mechanism. Referring to FIG. 7, reference manual 70 indicates heat producing component mounted on a substrate 72. The heat sinking mechanism comprises a heat spreader component 74, which in one embodiment, is integrally formed with the top or bottom wall of the enclosure. As will be noted, the heat spreader component 74 increases in cross-sectional area towards the heat producing component 70. A heat absorbing block 76 fast with the heat spreading component is in a physical contact with the heat producing component 70, and defines a thermal interface between the heat spreading component 74 and the heat producing component 70. A thermal conductivity of the heat spreading component 74 is less than a thermal conductivity of the heat absorbing block 76. In one embodiment, the heat absorbing block 76 may be of graphite, or diamond, and the heat spreading component 74 may be fabricated of material such as aluminum, copper, steel, etc. In one embodiment, an angle made by inclined side walls 78 of the heat spreading component 74 with respect to a plane that contains the heat absorbing block 76 is between 30 degrees and 60 degrees. In use, the heat absorbing block 76 rapidly absorbs heat from the heat producing component 70 and the heat spreading component 74 transports the heat absorbed by the heat absorbing block 76 to an area 80 of the top and bottom walls with which it is in contact. Since the area 80 is greater than an area of the heat producing component 70, heat produced by the heat producing component 74 is distributed over a wider area by the heat sink, thus reducing thermal hot spots. The heat transported by the heat spreading component 74 to the surface, is thereafter radiated into the atmosphere.

In one embodiment, the inclined side walls 78 of the heat spreading component 74 are insulated with a thermal jacket (not shown) to prevent heat escaping therethrough. This improves the heat transfer to the area 80.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for fabricating an enclosure for a mobile computing system, the method comprising:
   determining a height by which electronic components of an electronic assembly fabricated on a substrate stand proud of the substrate; and
   fabricating an enclosure to house the substrate with minimum clearance, the enclosure comprising a top panel, a bottom panel, and peripheral side panels interconnecting the top and bottom panels, wherein at least one of the top and bottom panels comprises a zone of reduced thickness that coincides with a portion of the electronic assembly of increased height, a zone of greater thickness that coincides with a portion of the electronic assembly of reduced height, and a strengthening beam, wherein at least one of the top and bottom panels further comprises a heat sink having a heat spreading component changing size in cross-sectional area along its height.

2. The method of claim 1, wherein the top and bottom panels comprise a plurality of said zones of reduced and increased thicknesses.

3. The method of claim 1, wherein the strengthening beam is integrally formed with the at least one of the top and bottom panels.

4. The method of claim 3, wherein the at least one of the top and bottom panels comprises a plurality of said strengthening beams, and wherein the strengthening beams are interconnected to provide greater rigidity.

5. An enclosure for a mobile computing system, the enclosure comprising:
a hollow body shaped and dimensioned to house a processing module, and a display module for a tablet personal computer, wherein the hollow body is defined by a top panel, a bottom panel, and peripheral side panels, wherein the top and bottom panels is fabricated to have zones of increased, and reduced thicknesses which correspond to areas of the processing module of reduced, and greater height, respectively, and comprises strengthening formations to increase a rigidity thereof, wherein at least one of the top and bottom panels further comprises a heat sink having a heat spreading component changing size in cross-sectional area along its height.

6. The enclosure of claim 5, wherein the strengthening formations include strengthening beams disposed in an interconnected pattern.

7. The enclosure of claim 6, wherein the strengthening beams are integrally formed with the top and bottom panels.

8. The enclosure of claim 5, wherein the heat sink comprises the heat spreading component fast with at least one of the top and bottom panels, and a heat absorbing block fast with the heat spreading component, wherein the heat spreading component has a lower thermal conductivity than the heat absorbing block, and wherein a height of the heat sinking mechanism permits the heat absorbing block to be in physical contact with the heat producing component.

9. The enclosure of claim 8, wherein the heat spreading component decreases in the cross-sectional area along its height and in a direction towards the heat absorbing component.

10. The enclosure of claim 8, wherein the heat spreading component has a frusto-conical shape.

11. The enclosure of claim 8, wherein sides of the heat spreading component make an angle of between 30 and 60 degrees with respect to a horizontal plane containing the heat absorbing block.

12. The enclosure of claim 11, wherein the sides of the heat spreading component make an angle of 45 degrees with respect to the horizontal plane.

13. A system comprising:
a processing module including a plurality of electronic components mounted on a substrate; and
an enclosure to house the processing module, the enclosure comprising top and bottom walls and peripheral side walls that together define a hollow body, wherein at least one of the top and bottom walls comprises zones of increased and reduced thicknesses which correspond to portions of the processing module of reduced, and increased height, respectively, and a strengthening beam to increase a rigidity thereof, wherein at least one of the top and bottom panels comprises a heat sink having a heat spreading component changing size in cross-sectional area along its height.

14. The system of claim 13, further comprising a plurality of strengthening beams arranged in an interconnected pattern for greater rigidity.

15. The system of claim 13, wherein the heat sink comprises the heat spreading component fast therewith, and a heat absorbing block fast with the heat spreading component, wherein a thermal conductivity of the heat spreading component block is less than a thermal conductivity of the heat absorbing block, and a height of the heat sink allows the heat absorbing block to be in physical contact with a heat producing component of the processing module.

16. The system of claim 15, wherein walls of the heat spreading component are inclined relative to a horizontal plane containing the heat absorbing block at an angle of 45 degrees.

17. A method for fabricating an enclosure for a mobile computing system, the method comprising:
constructing a top and a bottom panel including fabricating a frame comprising a plurality of interconnected beams for each of the top and bottom panels;
covering the frame with a sheet material; and
fabricating side walls interconnecting the top and bottom panels, wherein at least one of the top and bottom panels further comprises a heat sink having a heat spreading component changing size in a cross-sectional area along its height.

18. The method claim 17, wherein the at least one of the top and bottom panels comprises zones of increased thickness each coinciding with a portion of an electronic assembly to be housed in the enclosure of reduced height, and zones of reduced thickness, each coinciding with a portion of the electronic assembly of increased height.

19. The method of claim 1, wherein the heat sink comprises a heat spreading component fast with at least one of the top and bottom panels, and a heat absorbing block fast with the heat spraeding component, wherein the heat spreading component has a lower thermal conductivity than the heat absorbing block, and wherein a height of the heat sink permits the heat absorbing block to be in physical contact with the electronic component.

* * * * *

UNITED STATES PATENT AND TRADEMARK OFFICE
CERTIFICATE OF CORRECTION

PATENT NO. : 6,982,866 B2
APPLICATION NO. : 10/366991
DATED : January 3, 2006
INVENTOR(S) : Ghosh It is certified that error appears in the above-identified patent and that said Letters Patent is hereby corrected as shown below:

In column 5, at line 11, after "wherein" insert --at least one of--.
In column 5, at line 31, delete "sinking mechanism" and insert --sink--.
In column 6, at line 19, delete "a" and insert --the--.
In column 6, at line 45, delete "spraeding" and insert --spreading--.

Signed and Sealed this

Fourth Day of September, 2007

JON W. DUDAS
*Director of the United States Patent and Trademark Office*